(Model.)
3 Sheets—Sheet 1.
W. F. BURDITT.
TRIP MECHANISM FOR HARVESTER RAKES.
No. 279,702. Patented June 19, 1883.
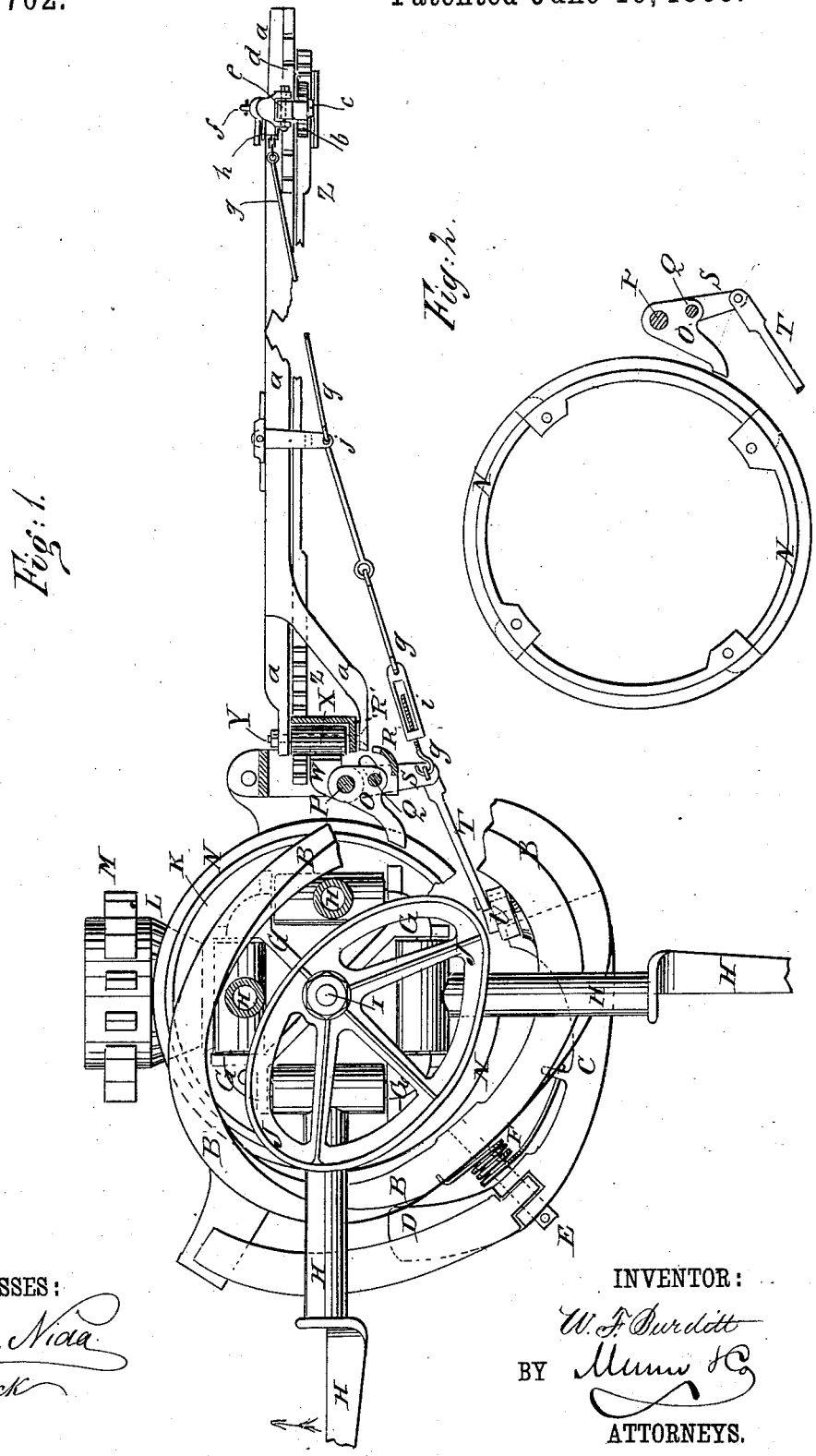
WITNESSES:
INVENTOR:
W. F. Burditt
BY Munn & Co
ATTORNEYS.

(Model.)
3 Sheets—Sheet 2.
W. F. BURDITT.
TRIP MECHANISM FOR HARVESTER RAKES.
No. 279,702. Patented June 19, 1883.
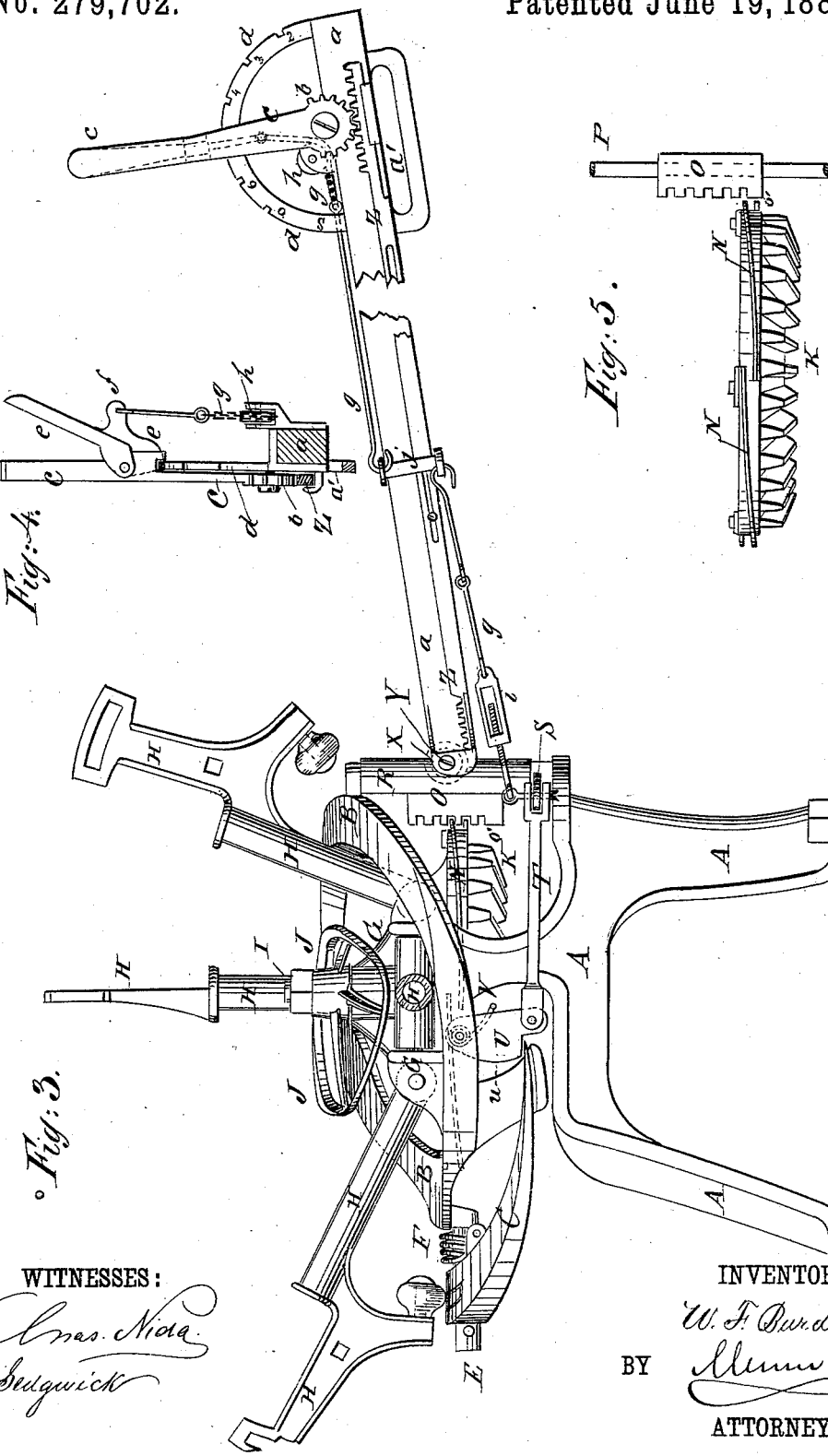
WITNESSES:
Chas. Nida
C. Sedgwick
INVENTOR:
W. F. Burditt
BY Munn & Co
ATTORNEYS.

(Model.)
W. F. BURDITT.
TRIP MECHANISM FOR HARVESTER RAKES.
No. 279,702. Patented June 19, 1883.
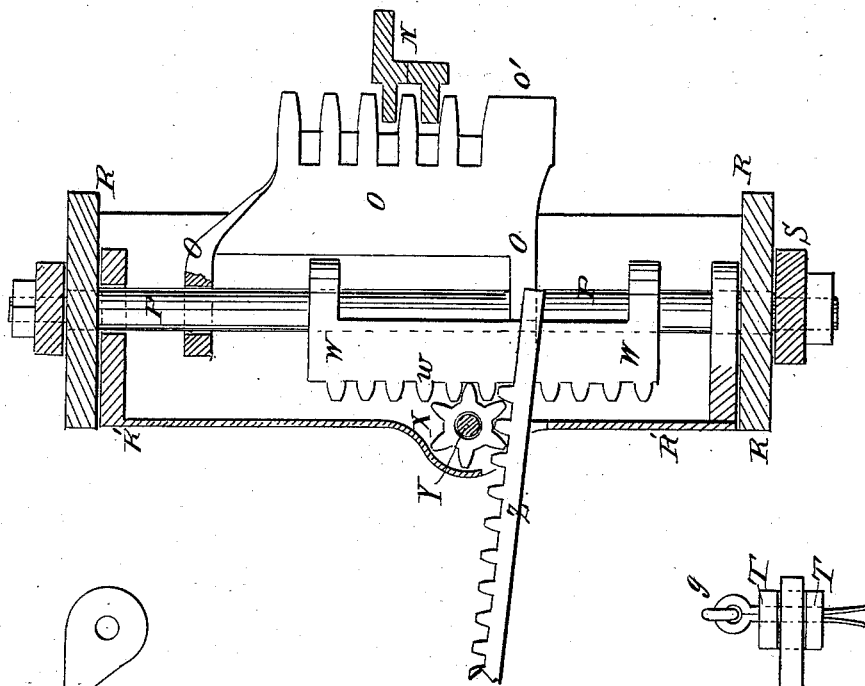
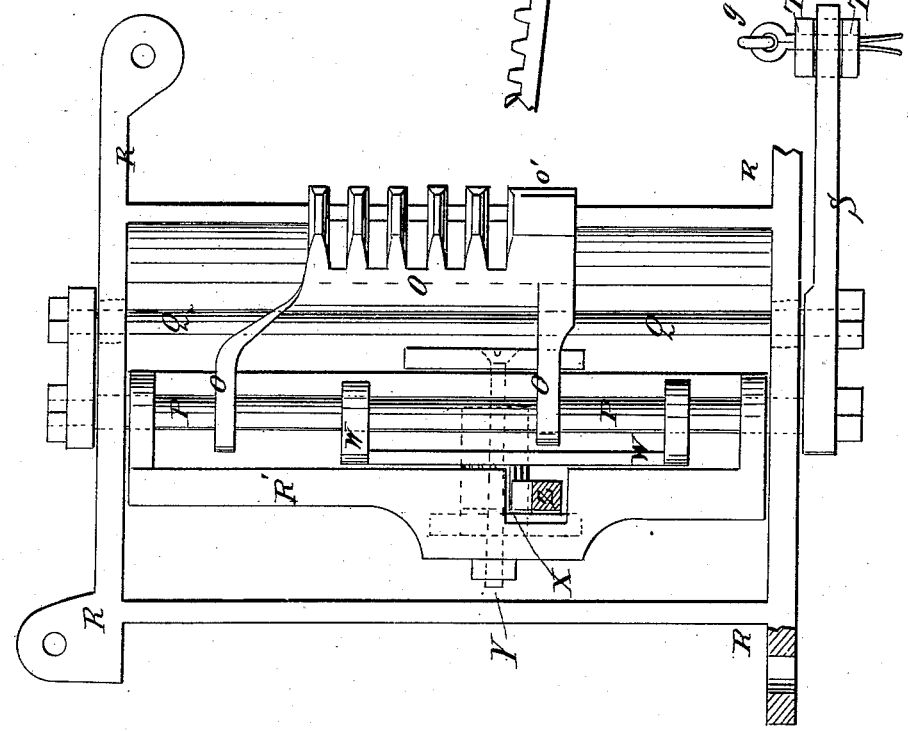
WITNESSES:
INVENTOR:
W. F. Burditt
BY Munn & Co.
ATTORNEYS.

UNITED STATES PATENT OFFICE.

WILLIAM F. BURDITT, OF ST. JOHN, NEW BRUNSWICK, CANADA.

TRIP MECHANISM FOR HARVESTER-RAKES.

SPECIFICATION forming part of Letters Patent No. 279,702, dated June 19, 1883.

Application filed August 21, 1882. (Model.)

*To all whom it may concern:*

Be it known that I, WILLIAM F. BURDITT, of St. John, in the Province of New Brunswick and Dominion of Canada, have invented a new and useful Improvement in Trip Mechanisms for Harvester-Rakes, of which the following is a full, clear, and exact description.

Reference is to be had to the accompanying drawings, forming a part of this specification, in which similar letters of reference indicate corresponding parts in all the figures.

Figure 1 is a plan view of my improvement as applied to a rake head and cam, parts being broken away and parts shown in section. Fig. 2 is a plan view of the sectional screw, the counting-slide, its lever, and a part of the connecting-link. Fig. 3 is a front elevation of the improvement as applied to a rake head and cam. Fig. 4 is an end elevation, partly in section, of a part of the same. Fig. 5 is a front elevation of the rake-head gear-wheel, the sectional screw and the counting-slide. Fig. 6 is an inner side elevation, on an enlarged scale, of the counting-slide, the regulating-slide, the slide-rods, the supporting-frame and the attached lever, the rack-bar being shown in section. Fig. 7 is a rear side elevation, partly in section, of the same, showing also a section of the sectional screw.

The object of this invention is to provide means by which the operator can cause every second, third, fourth, fifth, or sixth rake to sweep off a gavel, as the condition of the grain may require.

The invention consists in a trip mechanism for harvester-rakes constructed with a screw having sectional threads and connected with the rake-head and its gear-wheel, and engaging with a counting-slide having a blank section beneath its lowest tooth, so that the said slide will be raised by the said screw and then pushed back out of gear. The counting-slide is connected by a lever and link with the switch-latch, so that the backward movement of the counting-slide will trip the said latch and the forward movement of the latch will throw the counting-slide again into gear with the screw. The movement of the counting-slide is limited by a regulating-slide operated by an adjusting-lever and locked in place by a pawl and lock-bar connected with the said adjusting-lever. The adjusting-lever and its pawl and lock-bar are connected with the regulating-slide by a pinion, a rack, and a bar, to allow the said regulating-slide to be adjusted from a distance. The counting-slide, the switch-latch, and their connecting lever and link are connected by a chain with an arm formed upon the pawl of the adjusting-lever, so that the movement of the said pawl in unlocking the said adjusting-lever will draw back the said latch and counting-slide to allow the latter to be adjusted, all constructed and operating as will be hereinafter fully described.

A represents the rake-stand carrying the cam B, which stand is bolted to the harvester-frame.

C is the switch, which, being provided with a cam, D, is pivoted to a stud, E, attached to the cam B, and is held closed by a spring, F, in the ordinary manner.

To the stand A is pivoted by a bolt, I, the rake-head G, to which the rake-arms H are hinged in the ordinary manner. Only four arms are shown; but it is obvious that five or six may be used. To the upper end of the bolt I is attached a guide, J, to keep the rake-arms H in place as they travel around the cam B.

To the lower side of the rake-head G is rigidly attached, or upon it is formed, a beveled gear wheel, K, the teeth of which mesh with the teeth of the beveled pinion L, formed upon or rigidly connected with the chain-wheel M, that receives the endless chain, by means of which the rake is driven from the driving mechanism of the reaper.

To the rake-head G or its gear-wheel K are attached screw flanges or threads N N, as many being used as there are rake-arms hinged to the rake-head, and each thread has its forward end rounded or beveled. The screw-threads N engage with teeth or notches formed upon the block O, which slides upon two rods, P Q, and which is called by me the "counting-slide," so that the said counting-slide, when in gear with the screw-threads N, will be raised the space of one tooth by each thread. The ends of the rod P are attached to the top and bottom bars of a frame or bracket, R, which is bolted to the frame of the cam B, so that the said rod P will serve as a pivot for the counting-slide O. The ends of the rod Q pass through short curved slots in the top and bottom bars of the frame R, the said slots being made of such a length as to allow the counting-slide O to turn upon the rod P a sufficient distance to throw its teeth into and out of gear with the screw-threads N. The counting-slide O is made with six notches or teeth, more or less, according to the number of rake-arms used, and with a solid or blank section, $o'$, below the lowest notch, as shown in Figs. 3, 6, and 7.

To the lower ends of the slide-rods P Q is attached a lever, S, to the outer end of which is pivoted the end of a connecting rod or link, T. The other end of the connecting-rod T is pivoted to the lower end of the latch U, that holds the switch C open, and which is held forward against the end of said switch by a spring, V, attached to it and to the cam B.

W is a block, called by me the "regulating-slide," and which has upon its rear inwardly-projecting lugs, perforated to receive and slide upon the pivoted rod P. Upon the outer side of the regulating-slide W are formed rack-teeth $w$, to engage with the teeth of a pinion, X, which is pivoted by a bolt, Y, to the frame R', which is held in the bracket R by the rod P. The pinion X is made long, so that its teeth can also mesh with the teeth of the reciprocating rack-bar Z, so that the said pinion can be turned to raise and lower the regulating-slide W by moving the rack-bar Z. The rack-bar Z passes along and is supported in guides upon a bar, $a$, which is pivoted to the frame R' by the pivot-bolt Y of the pinion X. The rack-bar Z and the bar $a$ are made of such a length that their ends will be near the driver's seat, where the bar $a$ is secured in place by a bolt which passes through a keeper or slot, $a'$, attached to or formed in the said bar $a$, and into a suitable part of the main frame of the machine. Upon the upper side of the outer end of the rack-bar Z are formed rack-teeth, into which mesh the teeth of a segmental gear, $b$, on a lever, $c$, pivoted to the bar $a$. The lever $c$ moves along an arched locking-bar, $d$, attached to the bar $a$, and provided with notches to receive the lever-pawl $e$, pivoted to said lever $c$. The notches of the catch-bar $d$ are numbered 2 3 4 5 6 0, and are made at such a distance apart that the movement of the lever $c$ from one to another of the said notches will cause the rack-bar Z and the pinion X to move the regulating-slide W, and with it the connecting-slide, through the space of one tooth of the latter. The lever-pawl $e$ is made with an outwardly-projecting arm, $f$, to the end of which is connected the end of a chain, $g$, which passes around a guide-pulley, $h$, pivoted to a support attached to the bar $a$. The other end of the chain $g$ is connected with the split pin or bolt that pivots the counting-slide lever S to the connecting-rod T, or is connected with the slide-rods P Q by any suitable means. The greater portion of the chain $g$ can be formed of rods or long links, and said chain is provided with a turn-buckle, $i$, so that by detaching one end of the chain it can be lengthened or shortened to give it the exact length required; or the turn-buckle $i$ or its screw can be swiveled, so that the length of the chain $g$ can be regulated without detaching its end. The middle part of the chain $g$ can be connected with the middle part of the bar $a$ by a rectangular hinged coupling $j$, so that the direction of the chain $g$ can be changed without affecting its operation, the parts of the chain being connected with the outer corners of the said coupling.

When it is desired to have the second, third, fourth, fifth, or sixth rake-arm in regular order sweep the platform, the lever $c$ is adjusted to the notch of the lock-bar $d$ correspondingly numbered—as, for instance, to the notch marked 4. The regulating-slide W will then be adjusted in such a position as to limit the descent of the counting-slide O at such a point that the same number of teeth will be operated upon before the slide is raised to the tripping-point. As thus adjusted, when each fourth thread of the screw N reaches the counting-slide O and each fourth rake approaches the switch, the said slide will be pushed back by the end of said thread coming in contact with the solid portions $o'$ of the slide, thus withdrawing the latch U from the switch C and allowing the latter to be closed by its spring F, so that the fourth rake-arm will pass beneath the switch C and sweep the cut grain from the platform. As the switch C is released from the latch U its end moves along the curved or inclined edge $u$ of the latch and pushes said latch back a little farther, which movement turns the counting-slide O back so far that it can drop freely past the screw-threads N to rest upon the regulating-slide W, as the said threads cannot push the connecting-slide O out of contact with themselves. As the rake-arm comes in contact with the switch-cam D it forces the switch C down, so that its end will be caught and held by the latch U, the said latch being pushed forward by its spring V. The succeeding rakes will then run on top of the switch, and will be raised above the grain upon the platform. The forward movement of the latch U throws the teeth of the counting-slide O into gear with the screw-threads N, so that the slide will be gradually raised to be again tripped by the fourth thread, and so on as long as the regulating-slide is kept in the same position.

The regulating-slide can be adjusted at any time as the grain becomes heavier or lighter without its being necessary to stop the machine.

The mechanism for adjusting the regulating-slide W can be varied as the construction of the reaper may require.

In some cases the pinion X, rack Z, bar $a$, and trip-chain $g$ can be omitted and the lock-bar $d$ and adjusting-lever $c$ connected directly with the frame R and regulating-slide W, the arrangement in all cases depending upon the relative positions of the rake-head and driver's seat.

If desired or more convenient, the screw N can be placed in a vertical position and driven by the rake-head one or more revolutions to the passage of each rake, and the counting-slide could be caused to return by a spring of spiral or other form, the essential point being that the rotation of the screw shall be governed by the rotation of the rake-head or the mechanism connected therewith in such a way that its revolution can be turned so as to draw the connecting-slide a given and uniform distance for the passage of each rake.

Having thus described my invention, I claim as new and desire to secure by Letters Patent—

1. In a trip mechanism for harvester-rakes, the combination, with a rake-cam and a rake-head provided with a peripheral screw, of a counting-slide, a regulating-slide, a switch, a switch-latch, means for connecting the switch-latch and counting-slide, and means for adjusting the regulating-slide, substantially as herein shown and described.

2. In a trip mechanism for harvester-rakes, the combination, with the rake-cam B, the switch C, and its latch U, of the rake-head G, provided with the screw-threads N, the toothed counting-slide O, the regulating-slide W, the arm S, the connecting-rod T, and means, substantially as herein shown and described, for operating the regulating-slide and the switch-latch, as set forth.

3. In a trip mechanism for harvester-rakes, the combination, with the screw-threads N and the switch-latch U, of the counting-slide O, having a number of teeth corresponding with the screw-threads, and a blank section below the lowest tooth, substantially as herein shown and described, whereby the slide is raised by the screw and then pushed back to trip the switch-latch, as set forth.

4. In a trip mechanism for harvester-rakes, the combination, with the rake-cam B, the switch C, and its spring-latch U, of the rake-head G, the screw N, the toothed counting-slide O, the regulating-slide W, the arm S, the link T, the hand-lever $c$, and intermediate mechanism for operating the regulating slide and latch from said hand-lever, substantially as herein shown and described.

5. In a trip mechanism for harvester-rakes, the combination, with the frame R, the slotted frame R', the rods P Q, and the counting-slide pivoted to the rod P, of the regulating-slide W, sliding on the rod P, and having rack-teeth, the pinion X, and means for operating said pinion, substantially as herein shown and described.

6. In a trip mechanism for harvester-rakes, the combination, with the regulating-slide W, having rack-teeth, the adjusting-lever $c$, its pawl $e$, and the locking-bar $d$, of the pinion X, the rack-bar Z, and the bar $a$, substantially as shown and described, whereby the said adjusting-lever, its pawl, and lock-bar are placed at a distance from the said regulating-slide, as set forth.

7. In a trip mechanism for harvester-rakes, the combination, with the counting-slide O, the arm S, the connecting-rod T, and switch-latch U, of the adjusting-lever $c$, the pawl $e$, having arm $f$, and the connecting-chain $g$, substantially as herein shown and described, whereby the switch-latch and connecting-slide can be drawn back to allow the latter to be adjusted, as set forth.

WILLIAM F. BURDITT.

Witnesses:
   JOS. H. TIPPET,
   GEO. A. ROBINSON.